United States Patent
Saori

(10) Patent No.: US 8,422,143 B2
(45) Date of Patent: Apr. 16, 2013

(54) RETROFOCUS WIDE-ANGLE LENS SYSTEM AND OPTICAL INSTRUMENT PROVIDED WITH THE SAME

(75) Inventor: Masakazu Saori, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 85 days.

(21) Appl. No.: 13/205,878

(22) Filed: Aug. 9, 2011

(65) Prior Publication Data

US 2012/0044575 A1    Feb. 23, 2012

(30) Foreign Application Priority Data

Aug. 19, 2010    (JP) ................. 2010-184340

(51) Int. Cl.
| | |
|---|---|
| G02B 15/14 | (2006.01) |
| G02B 3/00 | (2006.01) |
| G02B 9/08 | (2006.01) |
| G02B 13/04 | (2006.01) |

(52) U.S. Cl.
USPC .......... 359/682; 359/680; 359/681; 359/737; 359/740; 359/749; 359/750; 359/751; 359/752; 359/753

(58) Field of Classification Search .......... 359/680–682, 359/737, 740, 749–753
See application file for complete search history.

(56) References Cited

U.S. PATENT DOCUMENTS
7,161,746 B2 *   1/2007   Mizuguchi ................. 359/749

FOREIGN PATENT DOCUMENTS
| JP | 2004-226740 | 8/2004 |
|---|---|---|
| JP | 2006-201526 | 8/2006 |
| JP | 2006-300972 | 11/2006 |
| JP | 2007-225804 | 9/2007 |

* cited by examiner

Primary Examiner — Evelyn A. Lester
(74) Attorney, Agent, or Firm — Greenblum & Bernstein P.L.C.

(57) ABSTRACT

A retrofocus wide-angle lens system is provided, wherein the entire the wide-angle lens system is divided at a position that satisfies the following condition (1) between a theoretical front lens group having a negative refractive power, and a theoretical rear lens group having a positive refractive power including the diaphragm, at a minimum focal length, and wherein a flat parallel plate is disposed at the position that satisfies the following condition (1):

$1.2 < |fF/f| < 4.0$ ... (1), wherein fF designates the focal length of the theoretical front lens group having a negative refractive power, and f designates the focal length of the entire the wide-angle lens system.

8 Claims, 15 Drawing Sheets

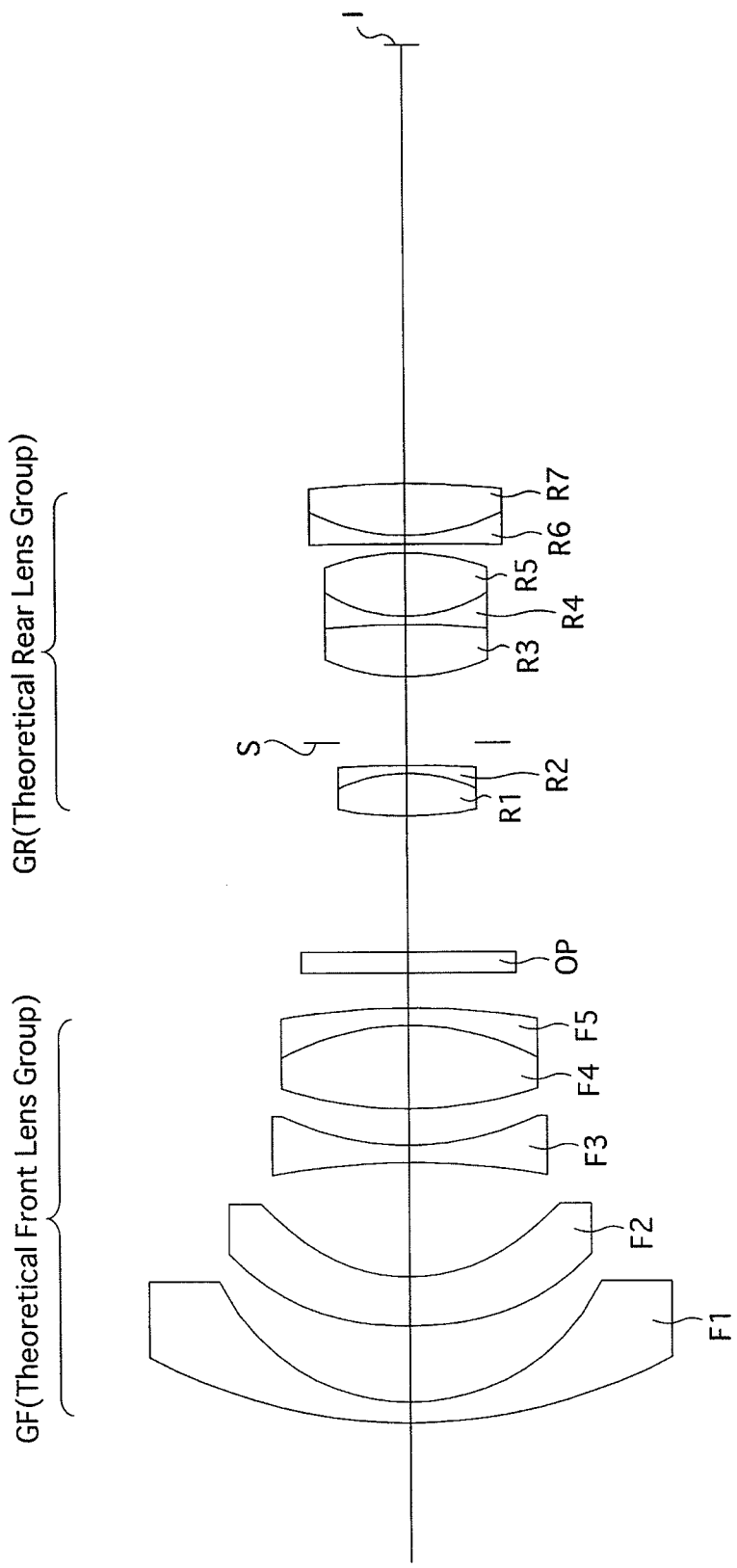

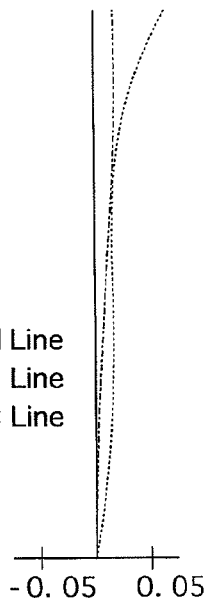
Fig. 2A
FNO.=1:4.1
—— d Line
········ g Line
–––––– C Line
-0.5  0.5
SPHERICAL
ABERRATION
CHROMATIC
ABERRATION
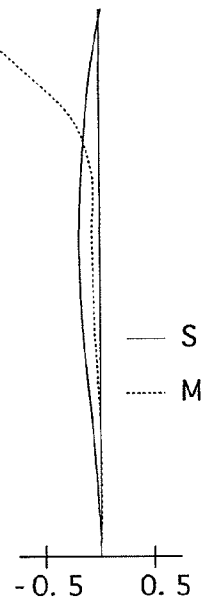
Fig. 2B
Y=34.85°
-0.05  0.05
LATERAL
CHROMATIC
ABERRATION
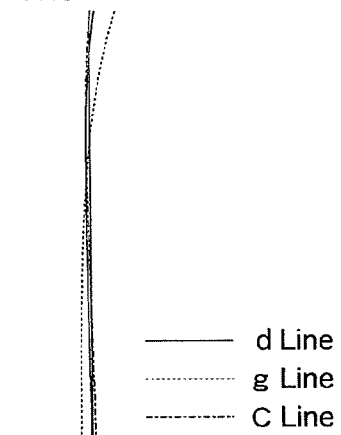
Fig. 2C
Y=34.85°
—— S
······ M
-0.5  0.5
ASTIGMATISM
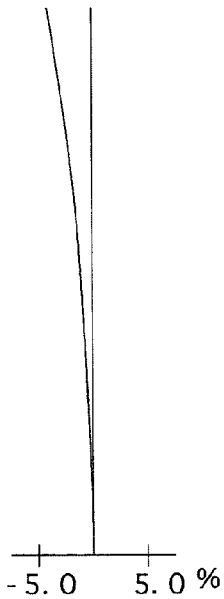
Fig. 2D
Y=34.85°
-5.0  5.0 %
DISTORTION
Fig. 3A
Y = 0.00    +0.20
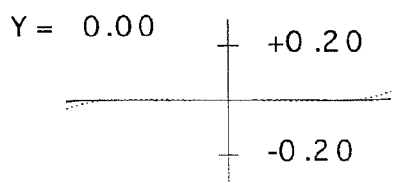
            -0.20
Fig. 3B
Y = 24.50   +0.20
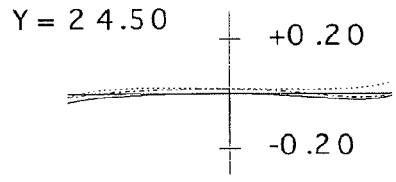
            -0.20
Fig. 3C
Y = 34.85   +0.20
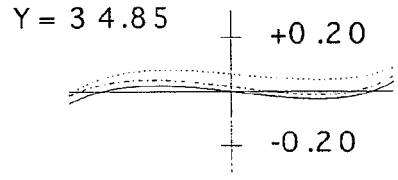
            -0.20
—— d Line
······ g Line
–––– C Line

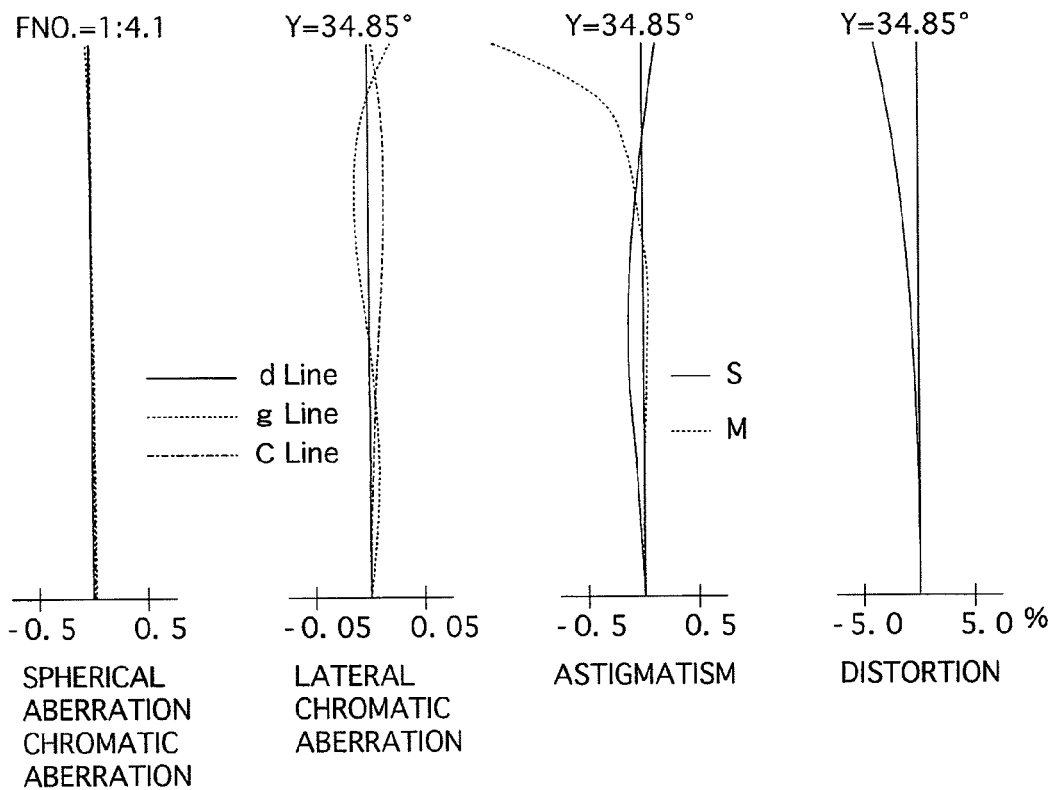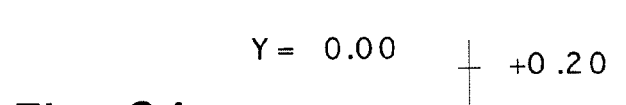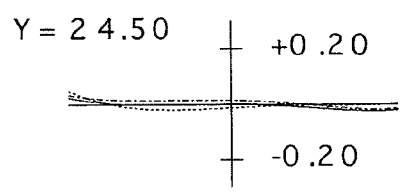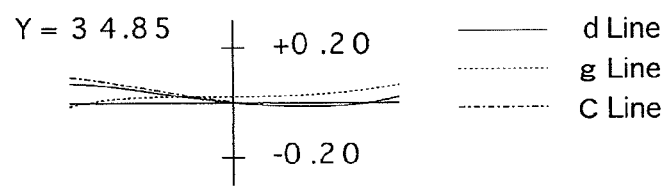

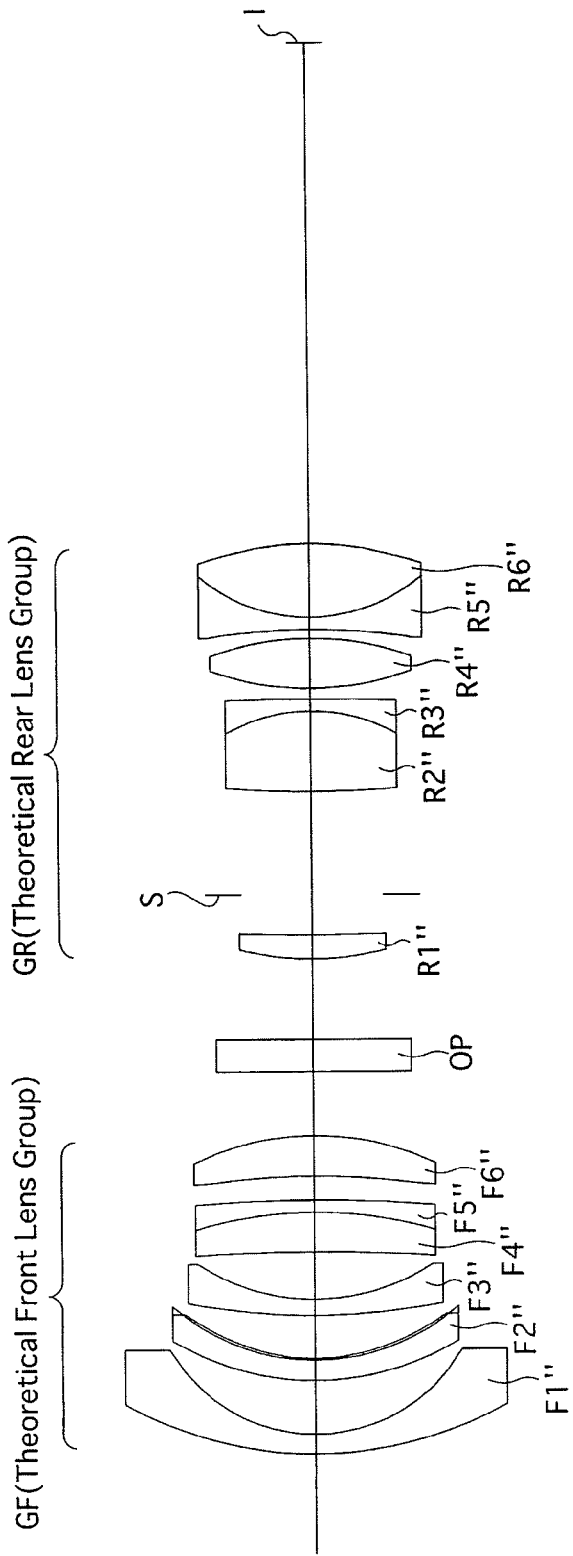

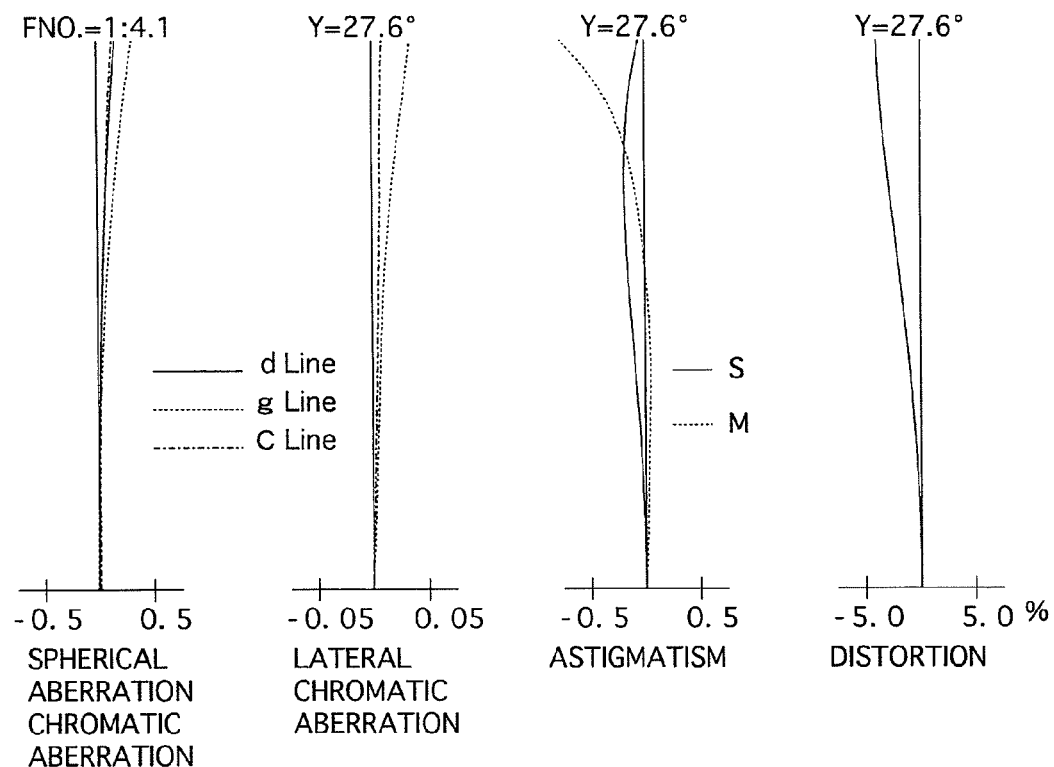
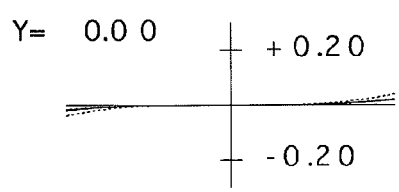
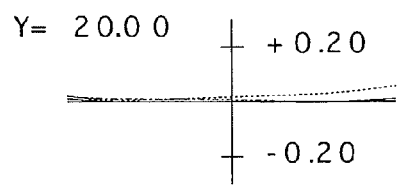
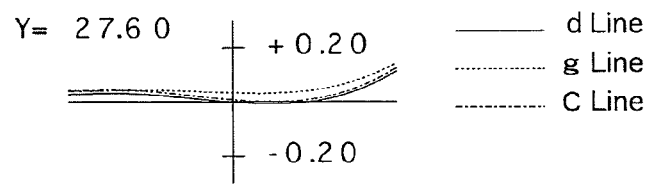

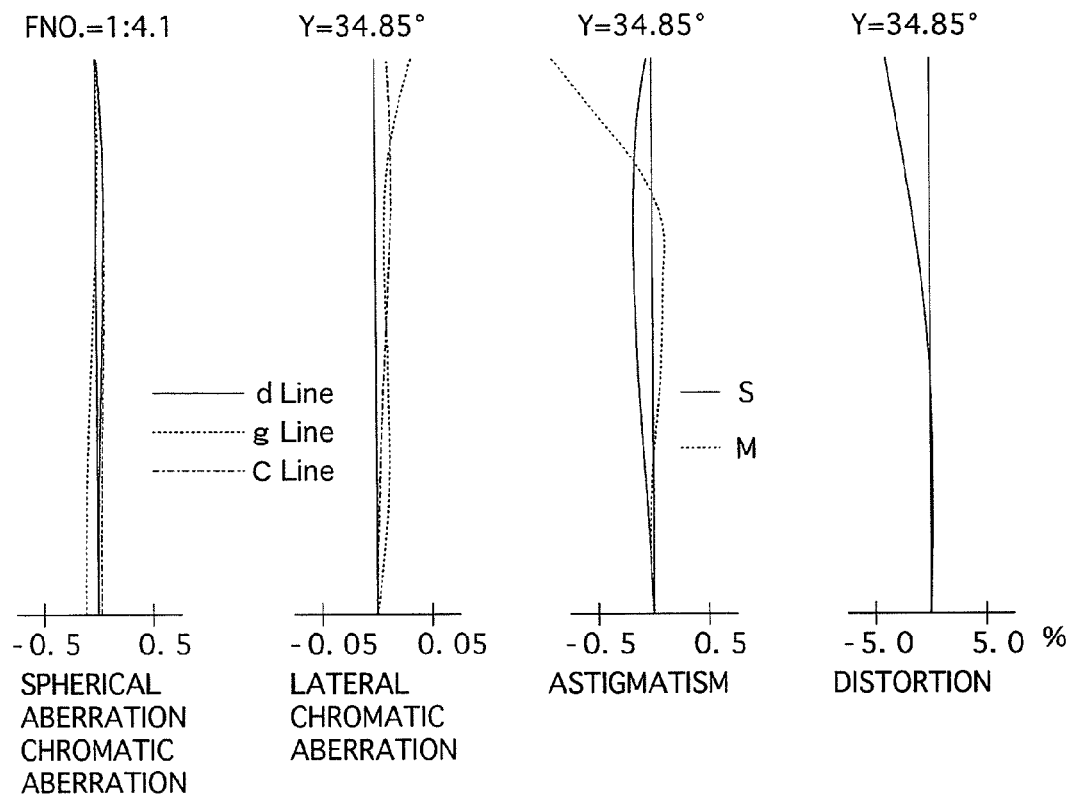
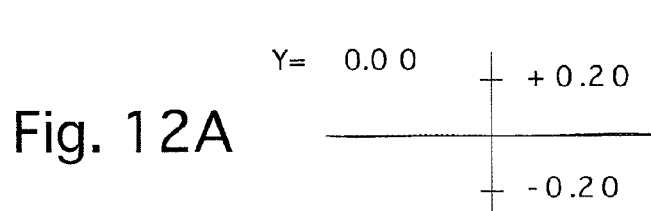
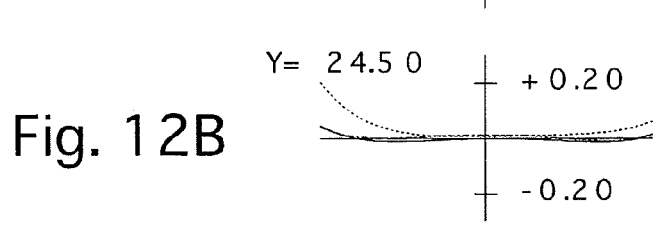
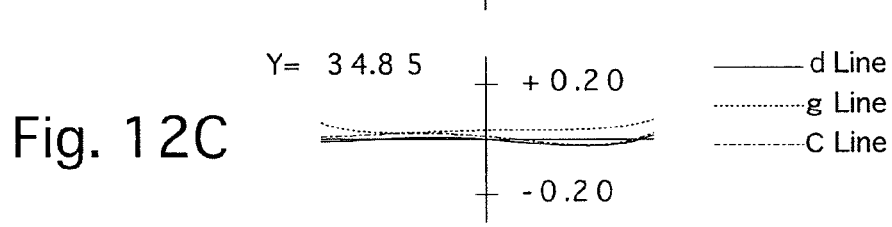

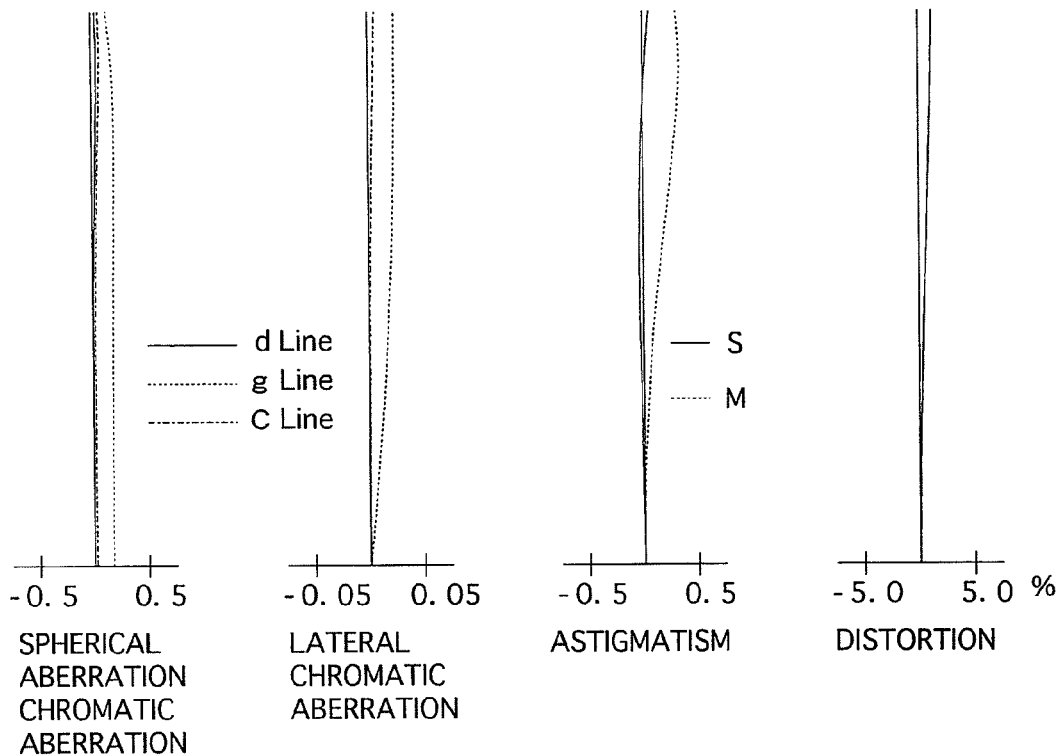

Fig. 17A  Fig. 17B  Fig. 17C  Fig. 17D

FNO.=1:3.6   W=50.6   W=50.6   W=50.6

— d Line
······· g Line
---- C Line

— S
---- M

-0.5   0.5     -0.05   0.05    -0.5   0.5    -5.0   5.0 %
SPHERICAL      LATERAL         ASTIGMATISM    DISTORTION
ABERRATION     CHROMATIC
CHROMATIC      ABERRATION
ABERRATION

Fig. 18C
Y = 14.24  +0.20      ——— d Line
                      ······· g Line
           -0.20      ---- C Line

RETROFOCUS WIDE-ANGLE LENS SYSTEM AND OPTICAL INSTRUMENT PROVIDED WITH THE SAME

BACKGROUND OF THE INVENTION

1. Field of the Invention

The present invention relates to a retrofocus wide-angle lens system and an optical instrument provided with this retrofocus wide-angle lens system.

2. Description of Related Art

Retrofocus wide-angle lens systems have been proposed (Japanese Unexamined Patent Publication Nos. 2007-225804, 2006-300972 and 2006-201526), as wide-angle lens systems for use in an SLR (single-lens reflex) camera, which are configured of a negative front lens group, and a positive rear lens group that includes a diaphragm, in that order from the object side, and which covers an angle-of-view of 90 through 100 degrees.

In a retrofocus wide-angle lens system, the lens diameter of the front lens group is large due to the wide angle-of-view. Hence, it is difficult to provide a normal-sized optical filter on the object side of the lens system (front lens group). Therefore it is not practical, as a product or in regard to cost, to increase the size of the optical filter in order to correspond to the diameter of the front lens group and the wide angle-of-view.

Although a method is utilized in which an optical filter is disposed on the image side of the lens system (rear lens group), a polarizing filter which is externally rotated by hand cannot in reality be used. Furthermore, in order to provide an optical filter on the image side, it is necessary to attain a long backfocus, causing the lens system to increase in size (length) and weight. Furthermore, due to the optical filter being disposed closer to the image side than the diaphragm, negative distortion that occurs in the lens elements (front lens group) that are provided on the object side of the diaphragm increase.

On the other hand, a method has been proposed (in Japanese Unexamined Patent Publication No. 2004-226740) in which an optical filter is inserted into the lens system. However, in that proposed insertion method, the incident angle of the oblique light rays with respect to the optical filter is reduced (so as to come closer to an afocal light bundle with respect to the optical filter) in order to merely avoid the influence of the angular characteristics of the optical filter.

Accordingly, it is unknown for a filter-insertion retrofocus wide-angle lens system of the related art to use an insertion filter or a built-in filter for correcting aberrations, especially distortion.

SUMMARY OF THE INVENTION

The present invention has been devised based on the discovery that negative distortion, which occurs in a theoretical front lens group that has a negative refractive power, can be effectively corrected if a flat parallel plate (optical filter) is inserted into the retrofocus wide-angle lens system at a specific position. In other words, the present invention provides a retrofocus wide-angle lens system which can effectively correct negative distortion that occurs at the lens group on the object side of the diaphragm in a retrofocus filter-insertion wide-angle lens system; the present invention also provides an optical instrument provided with such a retrofocus wide-angle lens system.

According to an aspect of the present invention, a retrofocus wide-angle lens system is provided, wherein the entire the wide-angle lens system is divided at a position that satisfies the following condition (1) between a theoretical front lens group having a negative refractive power and a theoretical rear lens group having a positive refractive power including the diaphragm, at a minimum focal length. A flat parallel plate is disposed at the position that satisfies the following condition (1):

$1.2 < |fF/f| < 4.0$ ... (1), wherein fF designates the focal length of the theoretical front lens group having a negative refractive power, and f designates the focal length of the entire the wide-angle lens system.

The wide-angle lens system can be a wide-angle fixed focal-length lens system or a wide-angle zoom lens system. In the present invention, the "minimum focal length" of the entire wide-angle lens system refers to a fixed focal length when focusing on an object at infinity in the case of a fixed focal-length wide-angle lens system, and refers to the focal length when focusing on an object at infinity at the short focal length extremity (wide-angle extremity) in the case of a wide-angle zoom lens system.

A retrofocus wide-angle lens system generally is configured of a negative front lens group and a positive rear lens group that includes a diaphragm. However, in the present invention, the "theoretical front lens group" and the "theoretical rear lens group" do not necessarily (although possible to) correspond to the front lens group and the rear lens group in the general sense. In other words, the dividing between the "theoretical front lens group" and the "theoretical rear lens group" of the present invention is a different concept to a front lens group and a rear lens group of a typical retrofocus lens system.

It is desirable for the position of the flat parallel plate to remain at a fixed (unchanging) position on the optical axis during a zooming operation.

It is desirable for the wide-angle lens system to satisfy the following condition (2) at a minimum focal length:

$0.1 < d/f$ ... (2), wherein d designates the thickness of the flat parallel plate, and f designates the focal length of the entire the wide-angle lens system.

It is desirable for the flat parallel plate to be an optical filter or a dummy glass plate. When the optical filter is not in use, it is practical for a dummy glass plate to be used in order to prevent a change in the in-focus position. Two or more exchangeable optical filters that have different optical characteristics, such as a color filter which controls the color tone, an ND filter which adjusts the quantity of light, and a externally-rotatable polarizing filter which cuts out unwanted reflected light, etc., can be freely used. The polarizing filter which needs to be rotatably-operated externally is ideally disposed at a midway position within the lens system. The thickness and the refractive index of the glass materials of each optical filter and the dummy glass are determined so as to have the same reduced distance (air-equivalent thickness/distance).

If two or more exchangeable flat parallel plates are built into a lens barrel provided with the wide-angle lens system, a smoother switching operation between the flat parallel plates (switching to the flat parallel plate to be used) can be achieved. For example, if a turret mechanism or a slider mechanism is employed, it becomes possible to use and easily exchange two or more flat parallel plates that have differing optical characteristics.

Alternatively, by enabling these flat parallel plates to be externally exchangeable, it becomes possible to use a large number of flat parallel plates having various optical characteristics in accordance with the desired use.

The present invention can be applied to an optical instrument provided with a retrofocus wide-angle lens system according to the above-described configurations (the fixed focal-length lens system or the zoom lens system). This optical instrument can be an apparatus having an exchangeable lens, like that of an SLR (single-lens reflex) camera, or can be a camera or a lens barrel in which a lens system and a film/imaging sensor are integrally provided.

According to the present invention, a retrofocus wide-angle lens system is achieved which can effectively correct negative distortion that occurs at the lens group on the object side of the diaphragm in a retrofocus filter-insertion wide-angle lens system; the present invention also provides an optical instrument provided with such a retrofocus wide-angle lens system.

The present disclosure relates to subject matter contained in Japanese Patent Application No. 2010-184340 (filed on Aug. 19, 2010) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a wide-angle lens system (wide-angle fixed focal-length lens system), according to the present invention, when focused on an object at infinity;

FIGS. 2A, 2B, 2C and 2D show the longitudinal aberrations that occurred in the lens arrangement shown in FIG. 1;

FIGS. 3A, 3B and 3C show the lateral aberrations that occurred in the lens arrangement shown in FIG. 1;

FIGS. 5A, 5B, 5C and 5D show the longitudinal aberrations that occurred in the lens arrangement shown in FIG. 4;

FIGS. 6A, 6B and 6C show the lateral aberrations that occurred in the lens arrangement shown in FIG. 4;

FIG. 7 shows a lens arrangement of a third numerical embodiment of a wide-angle lens system (wide-angle fixed focal-length lens system), according to the present invention, when focused on an object at infinity;

FIGS. 8A, 8B, 8C and 8D show the longitudinal aberrations that occurred in the lens arrangement shown in FIG. 7;

FIGS. 9A, 9B and 9C show the lateral aberrations that occurred in the lens arrangement shown in FIG. 7;

FIGS. 11A, 11B, 11C and 11D show the longitudinal aberrations that occurred in the lens arrangement shown in FIG. 10;

FIGS. 12A, 12B and 12C show the lateral aberrations that occurred in the lens arrangement shown in FIG. 10;

FIGS. 14A, 14B, 14C and 14D show the longitudinal aberrations that occurred in the lens arrangement shown in FIG. 13;

FIGS. 15A, 15B and 15C show the lateral aberrations that occurred in the lens arrangement shown in FIG. 13;

FIGS. 17A, 17B, 17C and 17D show the longitudinal aberrations that occurred in the lens arrangement shown in FIG. 16;

FIGS. 18A, 18B and 18C show the lateral aberrations that occurred in the lens arrangement shown in FIG. 16;

DESCRIPTION OF THE EMBODIMENTS

In the embodiments of the wide-angle fixed focal-length lens system (first through fourth numerical embodiments), the retrofocus wide-angle lens system of the present invention is configured of a negative front lens group GF and a positive rear lens group GR, in that order from the object side. A focusing operation on an object at infinity to an object at a close distance is carried out by either moving the entirety or a part of the rear lens group GR along the optical axis.

In the first numerical embodiment, as shown in FIG. 1, the front lens group GF is configured of a negative meniscus lens element F1 having a convex surface on the object side, a negative meniscus lens element F2 having a convex surface on the object side, a biconcave negative lens element F3, and a cemented lens provided with a biconvex positive lens element F4 and a negative meniscus lens element F5 having a convex surface on the image side, in that order from the object side. The negative meniscus lens element F2 has an aspherical surface formed on each side thereof. The rear lens group GR is configured of a cemented lens provided with a biconvex positive lens element R1 and a negative meniscus lens element R2 having a convex surface on the image side; a diaphragm S; a cemented lens provided with a biconvex positive lens element R3, a biconcave negative lens element R4, and a biconvex positive lens element R5; and a cemented lens provided with a biconcave negative lens element R6 and a biconvex positive lens element R7, in that order from the object side. The biconvex positive lens element R7 has an aspherical surface formed on the image side thereof. 'I' designates the imaging plane.

Figure 4:
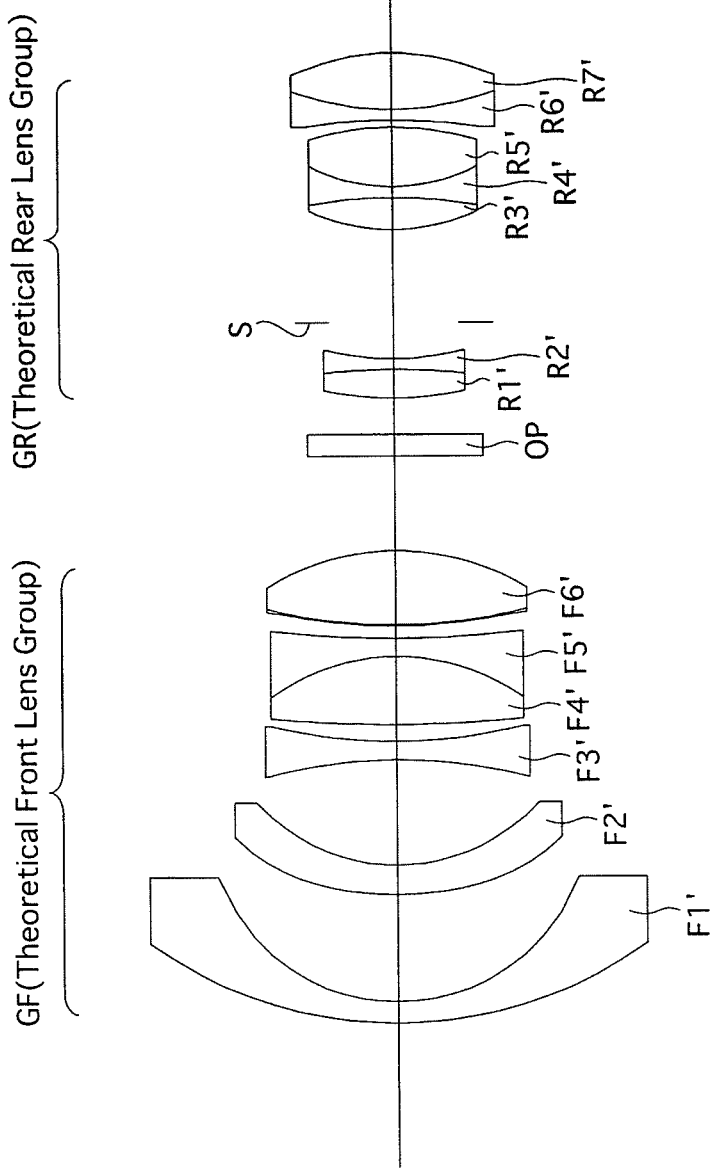
FIG. 4 shows a lens arrangement of a second numerical embodiment of a wide-angle lens system (wide-angle fixed focal-length lens system), according to the present invention, when focused on an object at infinity.

In the second numerical embodiment, as shown in FIG. 4, the front lens group GF is configured of a negative meniscus lens element F1' having a convex surface on the object side, a negative meniscus lens element F2' having a convex surface on the object side, a biconcave negative lens element F3', a cemented lens provided with a biconvex positive lens element F4' and a biconcave negative lens element F5'; and a biconvex positive lens element F6', in that order from the object side. The negative meniscus lens element F2' has an aspherical surface formed on the object side thereof. An aspherical layer formed by a compound resin is formed and bonded to the object side of the biconvex positive lens element F6'. The rear lens group GR is configured of a cemented lens provided with a biconvex positive lens element R1' and a biconcave negative lens element R2'; a diaphragm S; a cemented lens provided with a biconvex positive lens element R3', a biconcave negative lens element R4', and a biconvex positive lens element R5'; and a cemented lens provided with a biconcave negative lens element R6' and a biconvex positive lens element R7', in that order from the object side. The biconvex positive lens element R7' has an aspherical surface formed on the image side thereof. 'I' designates the imaging plane.

In the third numerical embodiment, as shown in FIG. 7, the front lens group GF is configured of a negative meniscus lens element F1" having a convex surface on the object side, a negative meniscus lens element F2" having a convex surface on the object side, a negative meniscus lens element F3" having a convex surface on the object side, a cemented lens provided with a positive meniscus lens element F4" having a convex surface on the image side and a negative meniscus lens element F5" having a convex surface on the image side; and a positive meniscus lens element F6" having a convex surface on the image side, in that order from the object side. An aspherical layer formed by a compound resin is formed and bonded to the image side of the negative meniscus lens element F2". The positive meniscus lens element F6" has an aspherical surface formed on the object side thereof. The rear lens group GR is configured of a positive meniscus lens element R1" having a convex surface on the object side, a diaphragm S, a cemented lens provided with a biconvex positive lens element R2" and a negative meniscus lens element R3" having a convex surface on the image side; a biconvex positive lens element R4"; and a cemented lens provided with a biconcave negative lens element R5" and a biconvex positive lens element R6", in that order from the object side. The biconvex positive lens element R6" has an aspherical surface formed on the image side thereof. 'I' designates the imaging plane.

Figure 10:
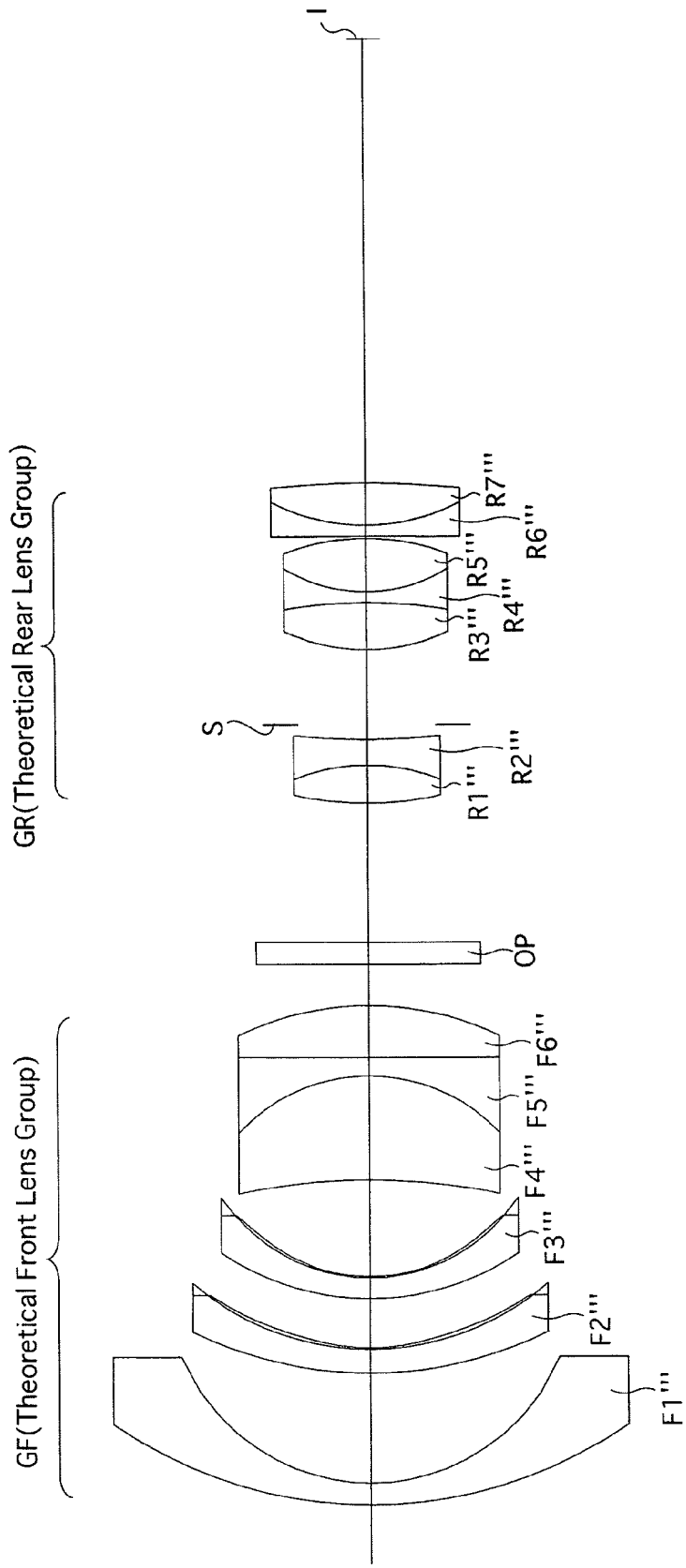
FIG. 10 shows a lens arrangement of a fourth numerical embodiment of a wide-angle lens system (wide-angle fixed focal-length lens system), according to the present invention, when focused on an object at infinity.

In the fourth numerical embodiment, as shown in FIG. 10, the front lens group GF is configured of a negative meniscus lens element F1''' having a convex surface on the object side, a negative meniscus lens element F2''' having a convex surface on the object side, a negative meniscus lens element F3''' having a convex surface on the object side, and a cemented lens provided with a positive meniscus lens element F4''' having a convex surface on the image side, a planoconcave negative lens element F5''' having a concave surface on the object side, and a planoconvex positive lens element F6''' having a convex surface on the image side, in that order from the object side. An aspherical layer formed by a compound resin is formed and bonded to the image side of the negative meniscus lens element F2''' and to the image side of the negative meniscus lens element F3'''. The rear lens group GR is configured of a cemented lens provided with a biconvex positive lens element R1''' and a biconcave negative lens element R2'''; a diaphragm S; a cemented lens provided with a biconvex positive lens element R3''', a biconcave negative lens element R4''' and a biconvex positive lens element R5'''; and a cemented lens provided with a biconcave negative lens element R6''' and a biconvex positive lens element R7''', in that order from the object side. The biconvex positive lens element R7''' has an aspherical surface formed on the image side thereof. 'I' designates the imaging plane.

If the wide-angle fixed focal-length lens system of the first through fourth numerical embodiments is divided into a negative front lens group and a positive rear lens group, in the sense of a general retrofocus lens system, it is possible to divide the lens system, e.g., in between the lens element F1 (F1', Fl" or F1'''') and the lens element F2 (F2', F2" or F2''''), in between the lens element F2 (F2', F2" or F2'''') and the lens element F3 (F3', F3" or F3''''), or in between the lens element F3 (F3', F3" or F3'''') and the lens element F4 (F4', F4" or F4''''), as an alternative to dividing the lens system into the front lens group GF and the rear lens group GR. Out of these possibilities, the wide-angle fixed focal-length lens system of the first through fourth numerical embodiments is divided in between the front lens group GF and the rear lens group GR at a position which satisfies condition (1) so as to be divided into a "theoretical front lens group having a negative refractive power" and a "theoretical rear lens group having a positive refractive power and including the diaphragm S", with an optical filter (flat parallel plate) OP disposed at the dividing position therebetween. In other words, in the first through fourth numerical embodiments, the "theoretical front lens group having a negative refractive power" corresponds to the front lens group GF and the "theoretical rear lens group having a positive refractive power and including the diaphragm S" corresponds to the rear lens group GR. Note that when the optical filter OP is not in use, a dummy glass plate that has the same thickness as that of the optical filter OP is disposed in between the front lens group GF and the rear lens group GR in order to prevent a change in the in-focus position.

Figure 13:
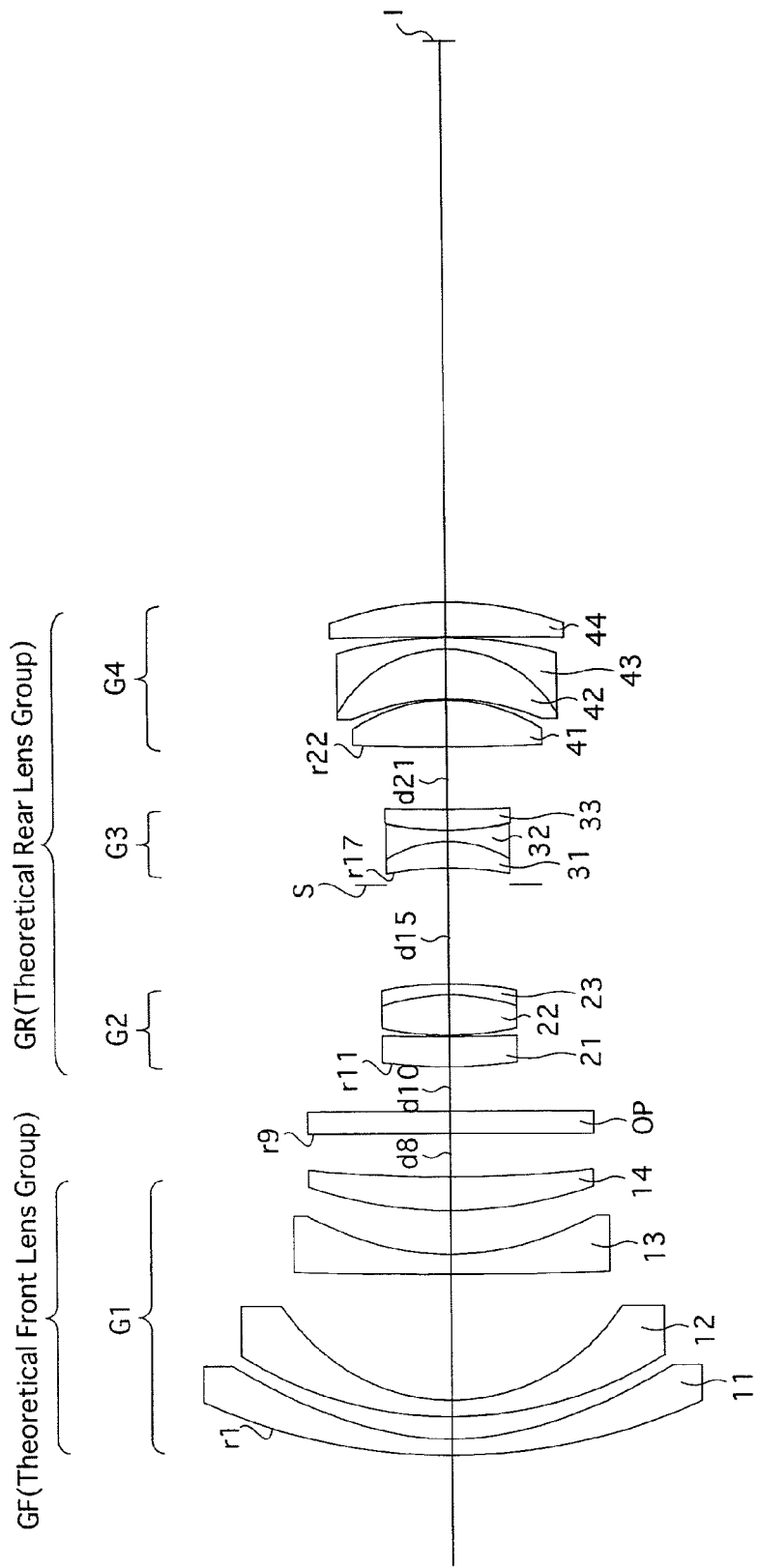
FIG. 13 shows a lens arrangement of a fifth numerical embodiment of a wide-angle lens system (wide-angle zoom lens system), according to the present invention, when focused on an object at infinity at the long focal length extremity.
Figure 16:
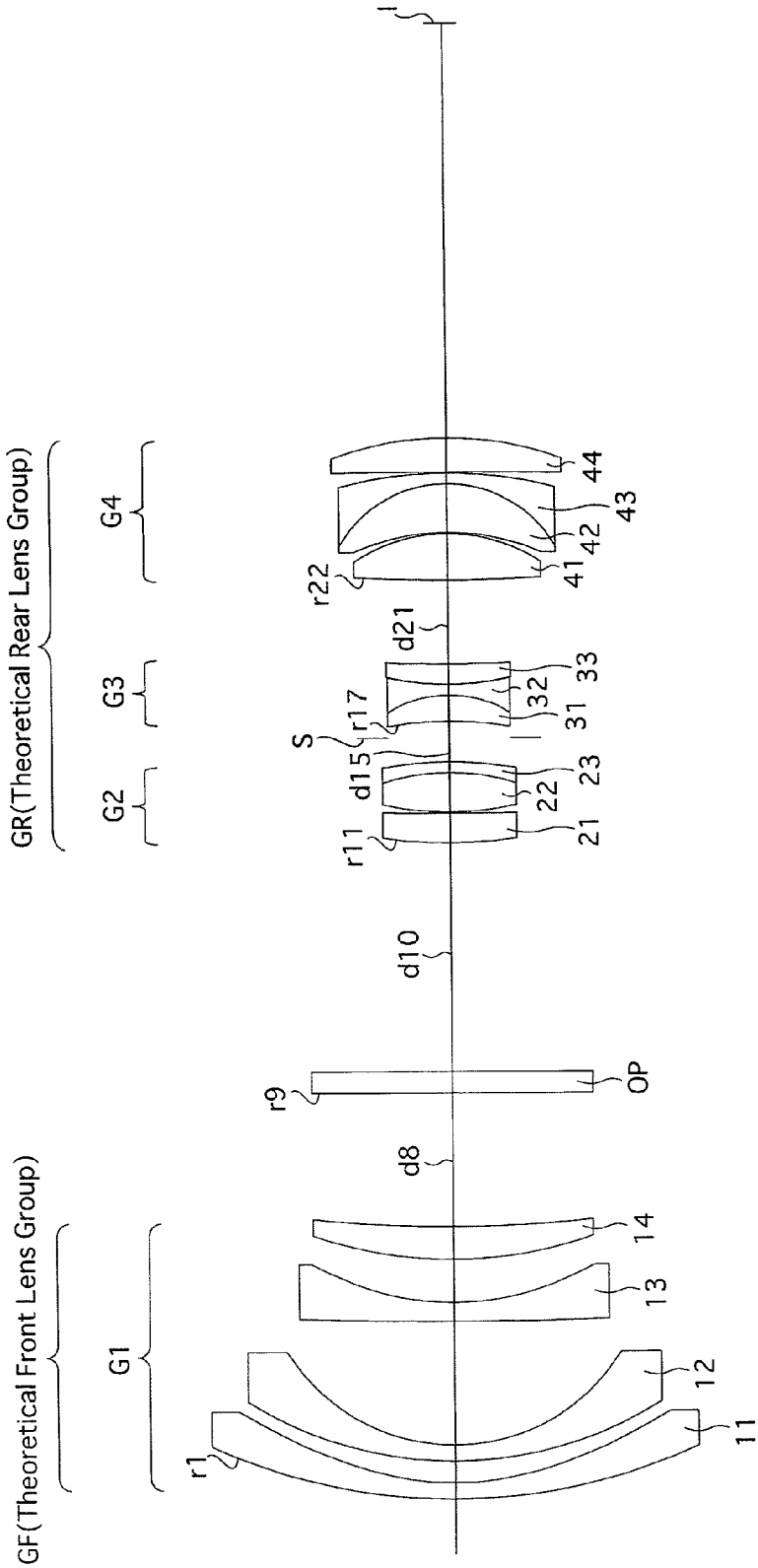
FIG. 16 shows a lens arrangement of the fifth numerical embodiment of a wide-angle lens system (wide-angle zoom lens system), according to the present invention, when focused on an object at infinity at the short focal length extremity.

As shown in FIGS. 13 and 16, a wide-angle zoom lens system (which is a fifth numerical embodiment of the retrofocus wide-angle lens system of the present invention) is configured of a negative first lens group G1, a positive second lens group G2, a positive third lens group G3, and a positive fourth lens group G4, in that order from the object side. Upon zooming from the short focal length extremity to the long focal length extremity, the first through fourth lens groups G1 through G4 move along the optical axis direction so that the distance between the first lens group G1 and the second lens group G2 decreases, the distance between the second lens group G2 and the third lens group G3 increases, and the distance between the third lens group G3 and the fourth lens group G4 decreases.

The first lens group G1 is configured of a negative meniscus lens element 11 having a convex surface on the object side, a negative meniscus lens element 12 having a convex surface on the object side, a negative meniscus lens element 13 having a convex surface on the object side, and a positive meniscus lens element 14 having a convex surface on the object side, in that order from the object side. An aspherical surface is formed on the image side on each of the negative meniscus lens element 11 and the negative meniscus lens element 13. The second lens group G2 is configured of a positive meniscus lens element 21 having a convex surface on the object side, and a cemented lens provided with a biconvex positive lens element 22 and a negative meniscus lens element 23 having a convex surface on the image side, in that order from the object side. The third lens group G3 is configured of a cemented lens provided with a positive meniscus lens element 31 having a convex surface on the image side and a biconcave negative lens element 32; and a positive meniscus lens element 33 having a convex surface on the object side, in that order from the object side. The diaphragm S which is disposed between the second lens group G2 and the third lens group G3 moves integrally with the third lens group G3 along the optical axis during zooming. The fourth lens group G4 is configured of a biconvex positive lens element 41; a cemented lens provided with a positive meniscus lens element 42 having a convex surface on the image side and a negative meniscus lens element 43 having a convex surface on the image side; and a positive meniscus lens element 44 having a convex surface on the image side, in that order from the object side. The biconvex positive lens element 41 has an aspherical surface formed on the image side thereof. 'I' designates the imaging plane.

If the wide-angle zoom lens system of the fifth numerical embodiment is divided into a negative front lens group and a positive rear lens group, in the sense of a general retrofocus lens system, it is possible to divide the lens system, e.g., in between the lens element 11 and the lens element 12, the lens element 12 and the lens element 13, and the lens element 13 and the lens element 14, as an alternative to dividing the lens system into the first lens group G1 and the second lens group G2. Out of these possibilities, the wide-angle zoom lens system of the fifth numerical embodiment is divided in between the first lens group G1 and the second lens group G2 at a position which satisfies condition (1) so as to be divided into a "theoretical front lens group having a negative refractive power" and a "theoretical rear lens group having a positive refractive power and including the diaphragm S", with an optical filter (flat parallel plate) OP disposed at the dividing position therebetween. In other words, in the fifth numerical embodiment, the "theoretical front lens group having a negative refractive power" corresponds to the first lens group G1 and the "theoretical rear lens group having a positive refractive power and including the diaphragm S" corresponds to the second through fourth lens groups G2 through G4. Note that when the optical filter OP is not in use, a dummy glass plate that has the same thickness as that of the optical filter OP is disposed in between the first lens group G1 and the second lens group G2 in order to prevent a change in the in-focus position.

In each of the first through fifth numerical embodiments, the entire optical system of the wide-angle lens system is divided into a "theoretical front lens group having a negative refractive power" and a "theoretical rear lens group having a positive refractive power and including the diaphragm S" at a position which satisfies condition (1).

Condition (1) specifies the absolute value of the ratio of focal length of the "theoretical front lens group having a negative refractive power" to the focal length of the entire lens systems, and effectively corrects negative distortion that occurs at the lens elements that are provided on the object side of the diaphragm S. Namely, if a dividing position of the wide-angle lens system that satisfies condition (1) is found and the optical filter (flat parallel plate) OP is disposed at this dividing position, since the optical filter OP adds positive distortion with respect to the incident abaxial light rays, the negative distortion that occurs in the lenses that are provided on the object side of the diaphragm S can be cancelled out, thereby effectively correcting the negative distortion.

Figure 19:
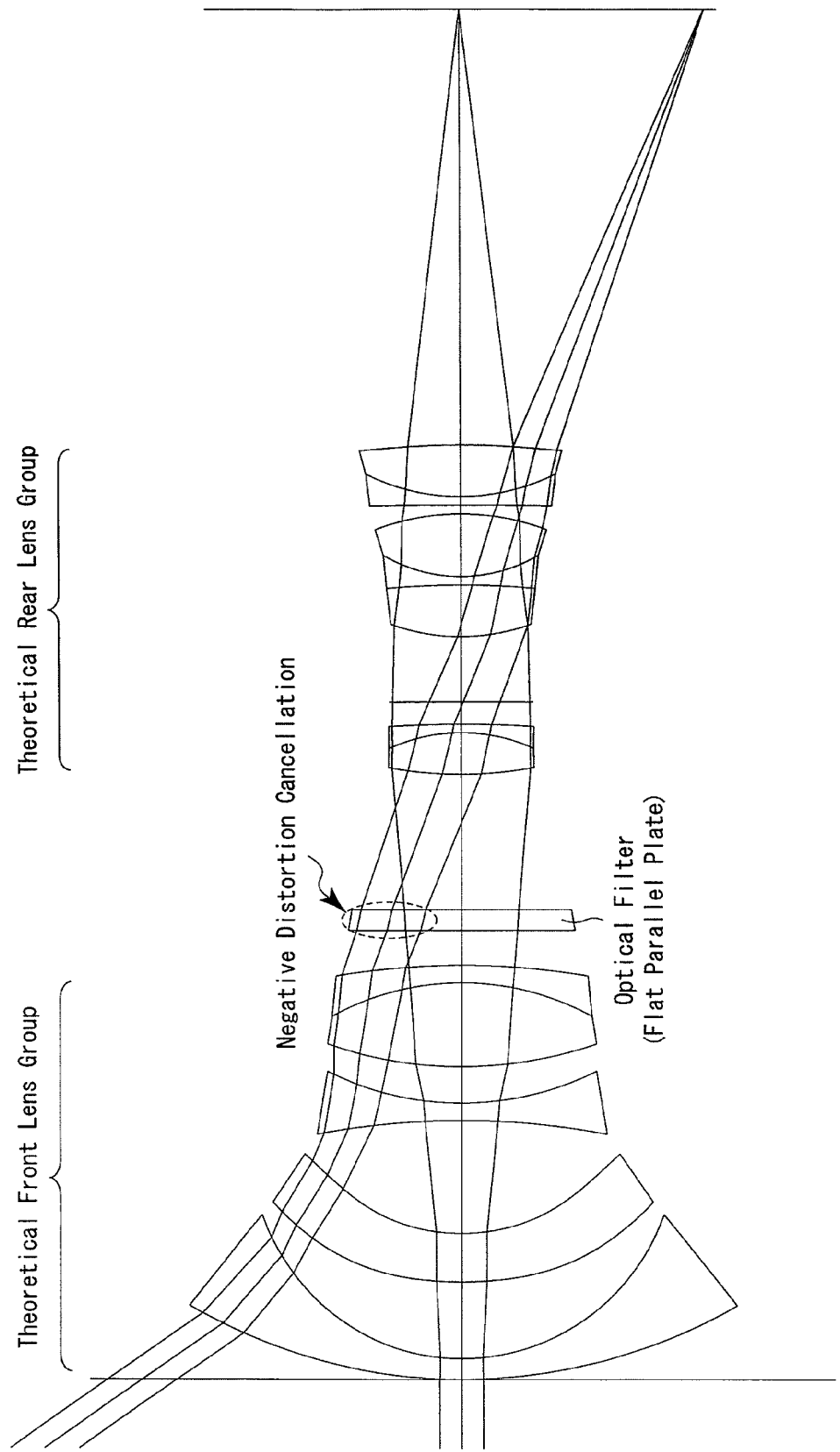
FIG. 19 is a first conceptual drawing showing a correction of negative distortion by an optical filter (flat parallel plate)
Figure 20:
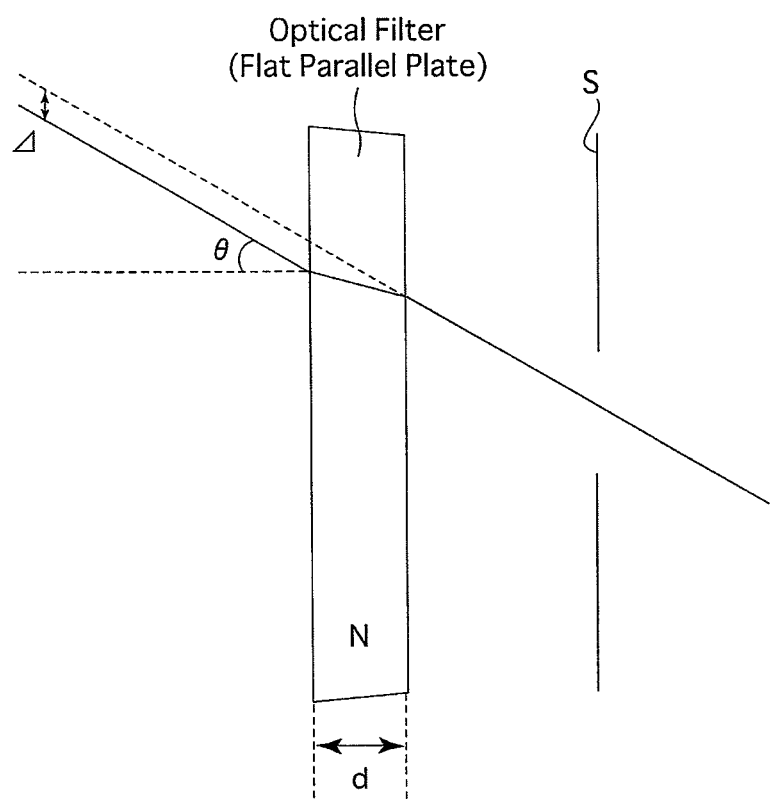
FIG. 20 is a second conceptual drawing showing a correction of negative distortion by an optical filter (flat parallel plate)

More specifically, as shown in FIGS. 19 and 20, when abaxial light rays are made incident onto the optical filter OP, the incident angle θ of the abaxial light rays does not change after passing through the optical filter OP, however, the position of the abaxial light rays shifts in a direction that is orthogonal to the optical axis by a shift amount Δ (image deviation). Accordingly, a positive distortion is added to the abaxial light rays, so as to cancel out the negative distortion that occurs in the lens elements which are provided on the object side of the diaphragm S. The shift amount Δ of the abaxial light rays is defined by the following formula 1.

$$\Delta = d \times \left( \frac{\sin\theta}{\sqrt{1 - \sin^2\theta}} - \frac{\sin\theta}{\sqrt{N - \sin^2\theta}} \right)$$ [Formula 1]

wherein,

Δ designates the shift amount (image deviation), in a direction that is orthogonal to the optical axis, after the abaxial light rays pass through the optical filter OP;

d designates the thickness of the optical filter OP;

θ designates the angle of incidence of the abaxial light rays onto the optical filter OP; and N designates the refractive index of the optical filter OP at the d-line.

As can be understood from Formula 1, the shift amount Δ becomes increasing larger as the refractive index of the optical filter OP at the d-line increases, and the effectiveness of the distortion correction increases.

Condition (1) specifies the optimum range of the angle of incidence of the abaxial light rays (with respect to the optical filter OP) in order to effectively correct distortion.

If the upper limit of condition (1) is exceeded, since the divergent power of the "theoretical front lens group having a negative refractive power" is weak, when attempts are made to achieve a long backfocus, it becomes necessary to increase the distance between the "theoretical front lens group having a negative refractive power" and the "theoretical rear lens group having a positive refractive power and including the diaphragm S". In such a case, the lens system of the "theoretical front lens group having a negative refractive power" becomes too large so that the negative distortion that occurs thereat increases. If the lower limit of condition (1) is exceeded, since the divergent power of the "theoretical front lens group having a negative refractive power" is strong, the angle of incidence θ of the abaxial light rays onto the optical filter OP becomes small, so that the effectiveness of the correction of distortion (via the addition of positive distortion) becomes small.

In the wide-angle zoom lens system (fifth numerical embodiment), a large amount of negative distortion occurs at the short focal length extremity (wide-angle extremity), and upon zooming toward the long focal length extremity (telephoto extremity), the amount of negative distortion decreases and eventually positive distortion occurs. Accordingly, in the wide-angle zoom lens system (fifth numerical embodiment) of the present invention, in order to manifest effective distortion correction (by adding position distortion) only at the short focal length extremity (wide-angle extremity), the optical filter OP is disposed at a position which satisfies condition (1) at the short focal length extremity, but does not satisfy condition (1) at the long focal length extremity.

Figure 21:
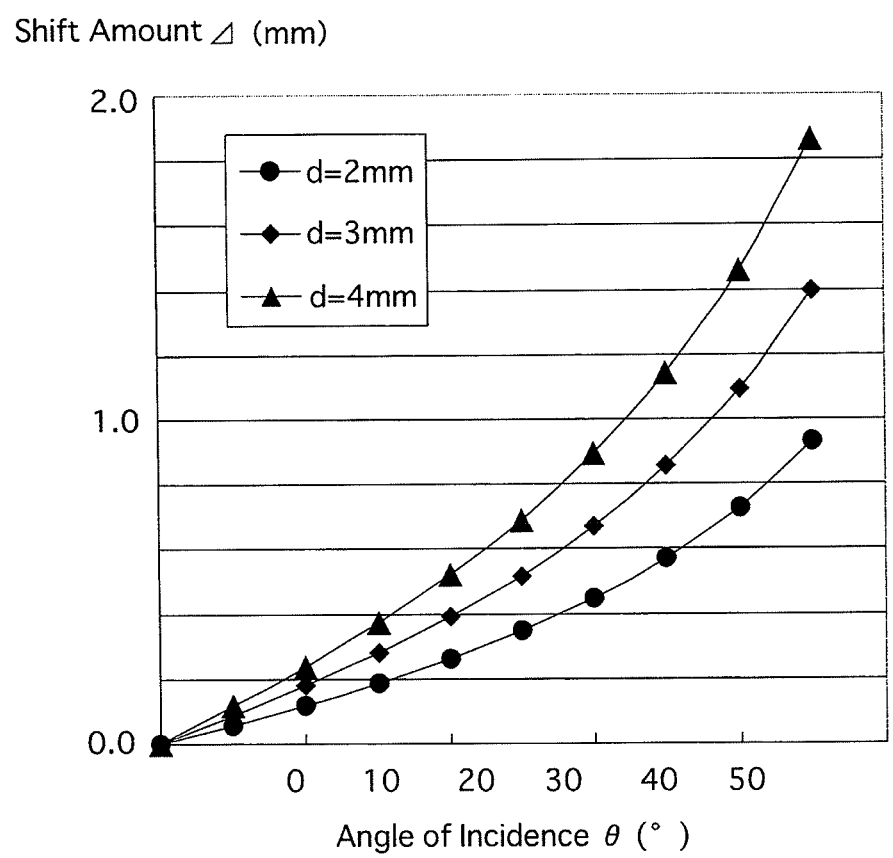
FIG. 21 is a diagram showing a relationship between the thickness of the optical filter (flat parallel plate) and the amount of image deviation.

As shown in FIG. 21, the greater the thickness d of the optical filter (flat parallel plate) OP, the greater the image deviation Δ, so that the correction of distortion becomes more effective (via the addition of positive distortion). Therefore, by setting the thickness d of the optical filter (flat parallel plate) OP so as to satisfy condition (2), effective correction of distortion (by adding a positive distortion) can be manifested by achieving a certain amount of image deviation Δ (the shift amount, in a direction that is orthogonal to the optical axis, with after the abaxial light rays pass through the optical filter OP). If the lower limit of condition (2) is exceeded, the amount of image deviation Δ becomes too small, so that the effectiveness of the distortion correction (by adding a position distortion) is insufficient.

[Embodiments]

Specific numerical embodiments will be herein discussed. In the longitudinal and lateral aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view(°), Y designates the image height, fB designates the backfocus, L designates the overall length of the lens system, r designates the radius of curvature, d designates the lens thickness or distance between lenses, N(d) designates the refractive index at the d-line, and νd designates the Abbe number with respect to the d-line. The values for the f-number, the focal length, the half angle-ofview, the image height, the backfocus, the overall length of the lens system, and the distance between lenses (which changes during zooming and according to the overall length of the lens system) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

[Numerical Embodiment 1]

FIGS. 1 through 3C and Tables 1 through 3 show a first numerical embodiment, which applies the wide-angle lens system of the present invention to a wide-angle fixed focal-length lens system. FIG. 1 shows a lens arrangement of the first numerical embodiment of the wide-angle lens system (wide-angle fixed focal-length lens system) when focused on an object at infinity. FIGS. 2A, 2B, 2C and 2D show the longitudinal aberrations that occurred in the lens arrangement shown in FIG. 1. FIGS. 3A, 3B and 3C show the lateral aberrations that occurred in the lens arrangement shown in FIG. 1. Table 1 shows the lens surface data, Table 2 shows the aspherical surface data and Table 3 shows various lens system data.

The wide-angle fixed focal-length lens system of the first numerical embodiment is a retrofocus lens system configured of a negative front lens group GF (surface Nos. 1 through 9), and a positive rear lens group GR (surface Nos. 12 through 22), in that order from the object side. A focusing operation on an object at infinity to an object at a close distance is carried out by moving the lens elements R3 through R7, of the rear lens group GR which are provided on the image side of the diaphragm S, toward the object side.

The front lens group GF is configured of a negative meniscus lens element F1 having a convex surface on the object side, a negative meniscus lens element F2 having a convex surface on the object side, a biconcave negative lens element F3, and a cemented lens having a biconvex positive lens element F4 and a negative meniscus lens element F5 having a convex surface on the image side, in that order from the object side. The negative meniscus lens element F2 has an aspherical surface formed on each side thereof.

The rear lens group GR is configured of a cemented lens having a biconvex positive lens element R1 and a negative meniscus lens element R2 having a convex surface on the image side; a diaphragm S; a cemented lens having a biconvex positive lens element R3, a biconcave negative lens element R4 and a biconvex positive lens element R5; and a cemented lens having a biconcave negative lens element R6 and a biconvex positive lens element R7, in that order from the object side. The biconvex positive lens element R7 has an aspherical surface formed on the image side thereof.

In the wide-angle fixed focal-length lens system of the first numerical embodiment, the entire lens system thereof is divided at a position that satisfies condition (1) between the front lens group GF and the rear lens group GR so as to divide into a "theoretical front lens group having a negative refractive power" and a "theoretical rear lens group having a positive refractive power and including the diaphragm S", and an optical filter (flat parallel plate) OP (surface Nos. 10 and 11) is provided at this divided position. In other words, in the first numerical embodiment, the "theoretical front lens group having a negative refractive power" corresponds to the front lens group GF and the "theoretical rear lens group having a positive refractive power and including the diaphragm S" corresponds to the rear lens group GR. Note that when the optical filter OP is not in use, a dummy glass plate that has the same thickness as that of the optical filter OP is disposed in between the front lens group GF and the rear lens group GR in order to prevent a change in the in-focus position.

TABLE 1

SURFACE DATA

| Surf. No. | r | d | N(d) | vd |
|---|---|---|---|---|
| 1 | 78.423 | 3.00 | 1.83481 | 42.7 |
| 2 | 30.589 | 11.00 | | |
| 3* | 56.395 | 7.00 | 1.73077 | 40.5 |
| 4* | 27.480 | 16.17 | | |
| 5 | −112.052 | 2.50 | 1.61800 | 63.4 |
| 6 | 44.248 | 5.16 | | |
| 7 | 60.515 | 11.92 | 1.74400 | 44.9 |
| 8 | −39.126 | 2.50 | 1.83481 | 42.7 |
| 9 | −109.767 | 5.00 | | |
| 10 | ∞ | 3.00 | 1.51680 | 64.2 |
| 11 | ∞ | 19.37 | | |
| 12 | 55.742 | 6.00 | 1.64769 | 33.8 |
| 13 | −25.052 | 1.20 | 1.77250 | 49.6 |
| 14 | −173.995 | 3.20 | | |
| 15(Diaphragm) | ∞ | 9.38 | | |
| 16 | 29.809 | 7.40 | 1.49700 | 81.6 |
| 17 | −121.824 | 1.20 | 1.80610 | 33.3 |
| 18 | 22.145 | 9.00 | 1.48749 | 70.4 |
| 19 | −35.199 | 1.30 | | |
| 20 | −651.902 | 1.20 | 1.83481 | 42.7 |
| 21 | 30.413 | 7.40 | 1.58913 | 61.2 |
| 22* | −100.773 | — | | |

The asterisk (*) designates an aspherical surface which is rotationally symmetrical with respect to the optical axis.

TABLE 2

Aspherical Surface Data (the aspherical surface coefficients not indicated are zero (0.00)):

| Surf. No. | K | A4 | A6 | A8 |
|---|---|---|---|---|
| 3 | 0.000 | 0.1088E−04 | −0.4936E−08 | 0.1220E−11 |
| 4 | 0.000 | 0.7529E−05 | −0.2475E−08 | −0.3269E−10 |
| 22 | 0.000 | 0.5796E−05 | 0.2608E−09 | |

TABLE 3

LENS SYSTEM DATA

| | |
|---|---|
| FNO. | 4.1 |
| f | 25.69 |
| W | 54.7 |
| Y | 34.85 |
| fB | 62.01 |
| L | 195.91 |

[Numerical Embodiment 2]

FIGS. 4 through 6C and Tables 4 through 6 show a second numerical embodiment, which applies the wide-angle lens system of the present invention to a wide-angle fixed focal-length lens system. FIG. 4 shows a lens arrangement of the second numerical embodiment of the wide-angle lens system (wide-angle fixed focal-length lens system) when focused on an object at infinity. FIGS. 5A, 5B, 5C and 5D show the longitudinal aberrations that occurred in the lens arrangement shown in FIG. 1. FIGS. 6A, 6B and 6C show the lateral aberrations that occurred in the lens arrangement shown in FIG. 4. Table 4 shows the lens surface data, Table 5 shows the aspherical surface data and Table 6 shows various lens system data.

The wide-angle fixed focal-length lens system of the second numerical embodiment is a retrofocus lens system configured of a negative front lens group GF (surface Nos. 1 through 12), and a positive rear lens group GR (surface Nos. 15 through 25), in that order from the object side. A focusing operation on an object at infinity to an object at a close distance is carried out by moving the lens elements R3' through R7', of the rear lens group GR which are provided on the image side of the diaphragm S, toward the object side.

The front lens group GF is configured of a negative meniscus lens element F1' having a convex surface on the object side, a negative meniscus lens element F2' having a convex surface on the object side, a biconcave negative lens element F3', a cemented lens having a biconvex positive lens element F4' and a biconcave negative lens element F5'; and a biconvex positive lens element F6', in that order from the object side. The negative meniscus lens element F2' has an aspherical surface formed on the object side thereof. An aspherical layer formed by a compound resin is formed and bonded to the object side of the biconvex positive lens element F6'.

The rear lens group GR is configured of a cemented lens having a biconvex positive lens element R1' and a biconcave negative lens element R2'; a diaphragm S; a cemented lens having a biconvex positive lens element R3', a biconcave negative lens element R4' and a biconvex positive lens element R5'; and a cemented lens having a biconcave negative lens element R6' and a biconvex positive lens element R7', in that order from the object side. The biconvex positive lens element R7' has an aspherical surface formed on the image side thereof.

In the wide-angle fixed focal-length lens system of the second numerical embodiment, the entire lens system thereof is divided at a position that satisfies condition (1) between the front lens group GF and the rear lens group GR so as to divide into a "theoretical front lens group having a negative refractive power" and a "theoretical rear lens group having a positive refractive power and including the diaphragm S", and an optical filter (flat parallel plate) OP (surface Nos. 13 and 14) is provided at this divided position. In other words, in the second numerical embodiment, the "theoretical front lens group having a negative refractive power" corresponds to the front lens group GF and the "theoretical rear lens group having a positive refractive power and including the diaphragm S" corresponds to the rear lens group GR. Note that when the optical filter OP is not in use, a dummy glass plate that has the same thickness as that of the optical filter OP is disposed in between the front lens group GF and the rear lens group GR in order to prevent a change in the in-focus position.

TABLE 4

SURFACE DATA

| Surf. No. | r | d | N(d) | vd |
|---|---|---|---|---|
| 1 | 58.874 | 3.00 | 1.83481 | 42.7 |
| 2 | 26.785 | 14.69 | | |
| 3* | 48.991 | 4.00 | 1.80610 | 40.7 |

TABLE 4-continued

SURFACE DATA

| Surf. No. | r | d | N(d) | vd |
|---|---|---|---|---|
| 4 | 26.493 | 14.47 | | |
| 5 | −71.737 | 2.50 | 1.61800 | 63.4 |
| 6 | 71.737 | 2.34 | | |
| 7 | 184.266 | 9.33 | 1.67270 | 32.2 |
| 8 | −30.158 | 2.50 | 1.84666 | 23.8 |
| 9 | 149.776 | 1.66 | | |
| 10* | 61.757 | 0.20 | 1.52972 | 42.7 |
| 11 | 75.302 | 10.16 | 1.58267 | 46.6 |
| 12 | −34.896 | 13.05 | | |
| 13 | ∞ | 3.00 | 1.51633 | 64.1 |
| 14 | ∞ | 5.00 | | |
| 15 | 47.152 | 3.89 | 1.84666 | 23.8 |
| 16 | −94.756 | 1.50 | 1.51742 | 52.2 |
| 17 | 38.948 | 5.00 | | |
| 18(Diaphragm) | ∞ | 12.79 | | |
| 19 | 28.083 | 4.40 | 1.45860 | 90.2 |
| 20 | −64.295 | 1.50 | 1.83400 | 37.3 |
| 21 | 25.283 | 8.12 | 1.48749 | 70.4 |
| 22 | −40.321 | 0.95 | | |
| 23 | −86.642 | 1.50 | 1.90366 | 31.3 |
| 24 | 39.900 | 7.73 | 1.58913 | 61.2 |
| 25* | −32.524 | — | | |

The asterisk (*) designates an aspherical surface which is rotationally symmetrical with respect to the optical axis.

TABLE 5

Aspherical Surface Data (the aspherical surface coefficients not indicated are zero (0.00)):

| Surf. No. | K | A4 | A6 | A8 |
|---|---|---|---|---|
| 3 | 0.000 | 0.8062E−05 | −0.2103E−08 | 0.7168E−11 |
| 10 | 0.000 | −0.9285E−05 | 0.9335E−08 | −0.4413E−11 |
| 25 | 0.000 | 0.4918E−05 | 0.2318E−08 | |

TABLE 6

LENS SYSTEM DATA

| FNO. | 4.1 |
|---|---|
| f | 25.71 |
| W | 54.7 |
| Y | 34.85 |
| fB | 60.49 |
| L | 193.77 |

[Numerical Embodiment 3]

FIGS. 7 through 9C and Tables 7 through 9 show a third numerical embodiment, which applies the wide-angle lens system of the present invention to a wide-angle fixed focal-length lens system. FIG. 7 shows a lens arrangement of the third numerical embodiment of the wide-angle lens system (wide-angle fixed focal-length lens system) when focused on an object at infinity. FIGS. 8A, 8B, 8C and 8D show the longitudinal aberrations that occurred in the lens arrangement shown in FIG. 7. FIGS. 9A, 9B and 9C show the lateral aberrations that occurred in the lens arrangement shown in FIG. 7. Table 7 shows the lens surface data, Table 8 shows the aspherical surface data and Table 9 shows various lens system data.

The wide-angle fixed focal-length lens system of the third numerical embodiment is a retrofocus lens system configured of a negative front lens group GF (surface Nos. 1 through 12), and a positive rear lens group GR (surface Nos. 15 through 25), in that order from the object side. A focusing operation on an object at infinity to an object at a close distance is carried out by moving the lens elements R2" through R6", of the rear lens group GR which are provided on the image side of the diaphragm S, toward the object side.

The front lens group GF is configured of a negative meniscus lens element F1" having a convex surface on the object side, a negative meniscus lens element F2" having a convex surface on the object side, a negative meniscus lens element F3" having a convex surface on the object side, a cemented lens having a positive meniscus lens element F4" having a convex surface on the image side and a negative meniscus lens element F5" having a convex surface on image side; and a positive meniscus lens element F6" having a convex surface on the image side, in that order from the object side. An aspherical layer formed by a compound resin is formed and bonded to the image side of the negative meniscus lens element F2". The positive meniscus lens element F6" has an aspherical surface formed on the object side thereof.

The rear lens group GR is configured of a positive meniscus lens element R1" having a convex surface on the object side, a diaphragm S; a cemented lens provided with a biconvex positive lens element R2" and a negative meniscus lens element R3" having a convex surface on the image side; a biconvex positive lens element R4"; and a cemented lens provided with a biconcave negative lens element R5" and a biconvex positive lens element R6", in that order from the object side. The biconvex positive lens element R6" has an aspherical surface is formed on the image side thereof.

In the wide-angle fixed focal-length lens system of the third numerical embodiment, the entire lens system thereof is divided at a position that satisfies condition (1) between the front lens group GF and the rear lens group GR so as to divide into a "theoretical front lens group having a negative refractive power" and a "theoretical rear lens group having a positive refractive power and including the diaphragm S", and an optical filter (flat parallel plate) OP (surface Nos. 13 and 14) is provided at this divided position. In other words, in the third numerical embodiment, the "theoretical front lens group having a negative refractive power" corresponds to the front lens group GF and the "theoretical rear lens group having a positive refractive power and including the diaphragm S" corresponds to the rear lens group GR. Note that when the optical filter OP is not in use, a dummy glass plate that has the same thickness as that of the optical filter OP is disposed in between the front lens group GF and the rear lens group GR in order to prevent a change in the in-focus position.

TABLE 7

SURFACE DATA

| Surf. No. | r | d | N(d) | vd |
|---|---|---|---|---|
| 1 | 48.954 | 2.50 | 1.77250 | 49.6 |
| 2 | 21.336 | 6.76 | | |
| 3 | 35.596 | 2.50 | 1.80420 | 46.5 |
| 4 | 27.789 | 0.20 | 1.52972 | 42.7 |
| 5* | 25.145 | 5.34 | | |
| 6 | 85.493 | 2.00 | 1.77250 | 49.6 |
| 7 | 27.446 | 5.87 | | |
| 8 | −252.845 | 4.89 | 1.60342 | 38.0 |
| 9 | −54.581 | 1.50 | 1.58913 | 61.2 |
| 10 | −200.390 | 3.00 | | |
| 11* | −78.777 | 5.00 | 1.58913 | 61.2 |
| 12 | −35.500 | 8.00 | | |
| 13 | ∞ | 4.00 | 1.74400 | 44.9 |
| 14 | ∞ | 10.00 | | |
| 15 | 38.468 | 3.00 | 1.62004 | 36.3 |
| 16 | 360.226 | 5.00 | | |
| 17(Diaphragm) | ∞ | 12.87 | | |
| 18 | 134.338 | 10.00 | | 1.45860 | 90.2 |

TABLE 7-continued

SURFACE DATA

| Surf. No. | r | d | N(d) | vd |
|---|---|---|---|---|
| 19 | −22.362 | 1.50 | 1.80420 | 46.5 |
| 20 | −324.793 | 1.35 | | |
| 21 | 37.789 | 6.25 | 1.45860 | 90.2 |
| 22 | −37.117 | 1.11 | | |
| 23 | −80.507 | 1.50 | 1.80420 | 46.5 |
| 24 | 21.927 | 9.19 | 1.58913 | 61.2 |
| 25* | −37.401 | — | | |

The asterisk (*) designates an aspherical surface which is rotationally symmetrical with respect to the optical axis.

TABLE 8

Aspherical Surface Data (the aspherical surface coefficients not indicated are zero (0.00)):

| Surf. No. | K | A4 | A6 | A8 |
|---|---|---|---|---|
| 5 | 0.000 | −0.8564E−05 | −0.6393E−08 | 0.1878E−10 |
| 11 | 0.000 | 0.4258E−05 | 0.1265E−07 | 0.2096E−10 |
| 25 | 0.000 | 0.6469E−05 | 0.3383E−08 | |

TABLE 9

LENS SYSTEM DATA

| FNO. | 4.1 |
|---|---|
| f | 26.75 |
| W | 47.1 |
| Y | 27.60 |
| fB | 62.11 |
| L | 175.44 |

[Numerical Embodiment 4]

FIGS. 10 through 12C and Tables 10 through 12 show a fourth numerical embodiment, which applies the wide-angle lens system of the present invention to a wide-angle fixed focal-length lens system. FIG. 10 shows a lens arrangement of the fourth numerical embodiment of the wide-angle lens system (wide-angle fixed focal-length lens system) when focused on an object at infinity. FIGS. 11A, 11B, 11C and 11D show the longitudinal aberrations that occurred in the lens arrangement shown in FIG. 10. FIGS. 12A, 12B and 12C show the lateral aberrations that occurred in the lens arrangement shown in FIG. 10. Table 10 shows the lens surface data, Table 11 shows the aspherical surface data and Table 12 shows various lens system data.

The wide-angle fixed focal-length lens system of the fourth numerical embodiment is a retrofocus lens system configured of a negative front lens group GF (surface Nos. 1 through 12), and a positive rear lens group GR (surface Nos. 15 through 25), in that order from the object side. A focusing operation on an object at infinity to an object at a close distance is carried out by moving the lens elements R3''' through R7''' of the rear lens group GR which are provided on the image side of the diaphragm S toward the object side.

The front lens group GF is configured of a negative meniscus lens element F1''' having a convex surface on the object side, a negative meniscus lens element F2''' having a convex surface on the object side, a negative meniscus lens element F3''' having a convex surface on the object side, and a cemented lens provided with a positive meniscus lens element F4''' having a convex surface on the image side, a planoconcave negative lens element F5''' having a concave surface on the object side, and a planoconvex positive lens element F6''' having a convex surface on the image side, in that order from the object side. An aspherical layer formed by a compound resin is formed and bonded to the image side of the negative meniscus lens element F2''' and to the image side of the negative meniscus lens element F3'''.

The rear lens group GR is configured of a cemented lens provided with a biconvex positive lens element R1''' and a biconcave negative lens element R2'''; a diaphragm S; a cemented lens provided with a biconvex positive lens element R3''', a biconcave negative lens element R4''' and a biconvex positive lens element R5'''; and a cemented lens provided with a biconcave negative lens element R6''' and a biconvex positive lens element R7''', in that order from the object side. The biconvex positive lens element R7''' has an aspherical surface formed on the image side thereof.

In the wide-angle fixed focal-length lens system of the fourth numerical embodiment, the entire lens system thereof is divided at a position that satisfies condition (1) between the front lens group GF and the rear lens group GR so as to divide into a "theoretical front lens group having a negative refractive power" and a "theoretical rear lens group having a positive refractive power and including the diaphragm S", and an optical filter (flat parallel plate) OP (surface Nos. 13 and 14) is provided at this divided position. In other words, in the fourth numerical embodiment, the "theoretical front lens group having a negative refractive power" corresponds to the front lens group GF and the "theoretical rear lens group having a positive refractive power and including the diaphragm S" corresponds to the rear lens group GR. Note that when the optical filter OP is not in use, a dummy glass plate that has the same thickness as that of the optical filter OP is disposed in between the front lens group GF and the rear lens group GR in order to prevent a change in the in-focus position.

TABLE 10

SURFACE DATA

| Surf. No. | r | d | N(d) | νd |
|---|---|---|---|---|
| 1 | 62.443 | 3.00 | 1.83481 | 42.7 |
| 2 | 28.278 | 15.06 | | |
| 3 | 55.215 | 3.30 | 1.77250 | 49.6 |
| 4 | 37.141 | 0.20 | 1.52972 | 42.7 |
| 5* | 26.856 | 6.88 | | |
| 6 | 37.116 | 2.80 | 1.58913 | 61.2 |
| 7 | 24.641 | 0.20 | 1.52972 | 42.7 |
| 8* | 25.017 | 13.10 | | |
| 9 | −86.709 | 14.18 | 1.80459 | 46.5 |
| 10 | −24.670 | 2.50 | 1.83400 | 37.3 |
| 11 | ∞ | 7.05 | 1.73596 | 43.0 |
| 12 | −41.739 | 5.60 | | |
| 13 | ∞ | 3.00 | 1.90366 | 31.3 |
| 14 | ∞ | 19.00 | | |
| 15 | 46.534 | 5.16 | 1.69181 | 30.5 |
| 16 | −26.627 | 3.50 | 1.69306 | 48.4 |
| 17 | 93.069 | 2.00 | | |
| 18(Diaphragm) | ∞ | 10.27 | | |
| 19 | 26.360 | 6.44 | 1.45860 | 90.2 |
| 20 | −67.028 | 1.50 | 1.80610 | 33.3 |
| 21 | 21.733 | 7.27 | 1.48749 | 70.4 |
| 22 | −31.808 | 0.30 | | |
| 23 | −841.652 | 1.50 | 1.83481 | 42.7 |
| 24 | 28.353 | 5.78 | 1.58913 | 61.2 |
| 25* | −94.711 | — | | |

The asterisk (*) designates an aspherical surface which is rotationally symmetrical with respect to the optical axis.

TABLE 11

Aspherical Surface Data (the aspherical surface coefficients not indicated are zero (0.00)):

| Surf. No. | K | A4 | A6 | A8 |
|---|---|---|---|---|
| 5 | 0.000 | −0.2548E−04 | 0.2528E−07 | −0.1908E−10 |
| 8 | 0.000 | 0.1846E−04 | −0.3342E−07 | −0.4296E−10 |
| 25 | 0.000 | 0.6347E−05 | −0.3052E−09 | |

TABLE 12

| LENS SYSTEM DATA | |
|---|---|
| FNO. | 4.1 |
| f | 25.67 |
| W | 54.7 |
| Y | 34.85 |
| fB | 60.45 |
| L | 200.04 |

[Numerical Embodiment 5]

FIGS. 13 through 18C and Tables 13 through 16 show a fifth numerical embodiment, which applies the wide-angle lens system of the present invention to a wide-angle zoom lens system. FIG. 13 shows a lens arrangement of the fifth numerical embodiment of the wide-angle lens system (wide-angle zoom lens system) when focused on an object at infinity at the long focal length extremity. FIGS. 14A, 14B, 14C and 14D show the longitudinal aberrations that occurred in the lens arrangement shown in FIG. 13. FIGS. 15A, 15B and 15C show the lateral aberrations that occurred in the lens arrangement shown in FIG. 13. FIG. 16 shows a lens arrangement of the fifth numerical embodiment of the wide-angle lens system (wide-angle zoom lens system) when focused on an object at infinity at the short focal length extremity. FIGS. 17A, 17B, 17C and 17D show the longitudinal aberrations that occurred in the lens arrangement shown in FIG. 16. FIGS. 18A, 18B and 18C show the lateral aberrations that occurred in the lens arrangement shown in FIG. 16. Table 13 shows the lens surface data, Table 14 shows the aspherical surface data, Table 15 shows various lens system data, and Table 16 shows the lens group data.

The wide-angle zoom lens system of the fifth numerical embodiment is configured of a negative first lens group G1 (surface Nos. 1 through 8), a positive second lens group G2 (surface Nos. 11 through 15), a positive third lens group G3 (surface Nos. 17 through 21), and a positive fourth lens group G4 (surface Nos. 22 through 28), in that order from the object side.

The first lens group G1 is configured of a negative meniscus lens element 11 having a convex surface on the object side, a negative meniscus lens element 12 having a convex surface on the object side, a negative meniscus lens element 13 having a convex surface on the object side, and a positive meniscus lens element 14, in that order from the object side. An aspherical surface is formed on the image side of the negative meniscus lens element 11 and the negative meniscus lens element 13.

The second lens group G2 is configured of a positive meniscus lens element 21 having a convex surface on the object side, and a cemented lens having a biconvex positive lens element 22 and a negative meniscus lens element 23 having a convex surface on the image side, in that order from the object side.

The third lens group G3 is configured of a cemented lens having a positive meniscus lens element 31 having a convex surface on the image side, and a biconcave negative lens element 32; and a positive meniscus lens element 33 having a convex surface on the object side, in that order from the object side. A diaphragm S (surface No. 16), which is provided in between the second lens group G2 and the third lens group G3, integrally moves with the third lens group G3 along the optical axis direction.

The fourth lens group G4 is configured of a biconvex positive lens element 41; a cemented lens provided with a positive meniscus lens element 42 having a convex surface on the image side, and a negative meniscus lens element 43 having a convex surface on the image side; and a positive meniscus lens element 44 having a convex surface on the image side, in that order from the object side. The biconvex positive lens element 41 has an aspherical surface formed on the image side thereof.

In the wide-angle zoom lens system of the fifth numerical embodiment is divided in between the first lens group G1 and the second lens group G2 at a position which satisfies condition (1) so as to be divided into a "theoretical front lens group having a negative refractive power" and a "theoretical rear lens group having a positive refractive power and including the diaphragm S", with an optical filter (flat parallel plate) OP (surface Nos. 9 and 10) disposed at the dividing position therebetween. In other words, in the fifth numerical embodiment, the "theoretical front lens group having a negative refractive power" corresponds to the first lens group G1 and the "theoretical rear lens group having a positive refractive power and including the diaphragm S" corresponds to the second through fourth lens groups G2 through G4. Note that when the optical filter OP is not in use, a dummy glass plate that has the same thickness as that of the optical filter OP is disposed in between the first lens group G1 and the second lens group G2 in order to prevent a change in the in-focus position.

TABLE 13

SURFACE DATA

| Surf. No. | r | d | N(d) | vd |
|---|---|---|---|---|
| 1 | 54.577 | 1.50 | 1.80500 | 34.9 |
| 2* | 25.604 | 2.00 | | |
| 3 | 36.010 | 1.50 | 1.80500 | 46.7 |
| 4 | 18.205 | 11.41 | | |
| 5 | 402.624 | 1.80 | 1.64610 | 57.2 |
| 6* | 25.534 | 3.92 | | |
| 7 | 39.824 | 3.00 | 1.84697 | 23.9 |
| 8 | 123.764 | d8 | | |
| 9 | ∞ | 2.00 | 1.51633 | 64.1 |
| 10 | ∞ | d10 | | |
| 11 | 44.796 | 2.72 | 1.55374 | 43.8 |
| 12 | 331.611 | 0.10 | | |
| 13 | 27.991 | 3.64 | 1.48749 | 70.2 |
| 14 | −19.756 | 1.00 | 1.80518 | 25.4 |
| 15 | −33.364 | d15 | | |
| 16(Diaphragm) | ∞ | 1.50 | | |
| 17 | −33.026 | 2.40 | 1.77194 | 26.4 |

TABLE 13-continued

SURFACE DATA

| Surf. No. | r | d | N(d) | vd |
|---|---|---|---|---|
| 18 | −10.635 | 1.00 | 1.77250 | 48.5 |
| 19 | 26.496 | 0.00 | | |
| 20 | 23.806 | 1.90 | 1.62489 | 35.5 |
| 21 | 167.952 | d21 | | |
| 22 | 161.568 | 4.22 | 1.56907 | 71.3 |
| 23* | −15.157 | 0.10 | | |
| 24 | −21.560 | 4.48 | 1.48749 | 70.2 |
| 25 | −11.516 | 1.00 | 1.80518 | 25.4 |
| 26 | −37.857 | 0.10 | | |
| 27 | −635.386 | 3.14 | 1.57552 | 43.0 |
| 28 | −30.202 | — | | |

The asterisk (*) designates an aspherical surface which is rotationally symmetrical with respect to the optical axis.

TABLE 14

Aspherical Surface Data (the aspherical surface coefficients not indicated are zero (0.00)):

| Surf. No. | K | A4 | A6 | A8 | A10 |
|---|---|---|---|---|---|
| 2 | 0.000 | −0.2179E−04 | 0.2040E−07 | −0.2875E−10 | −0.3088E−14 |
| 6 | 0.000 | 0.1127E−04 | −0.1572E−06 | 0.5429E−09 | −0.1220E−11 |
| 23 | 0.000 | 0.1423E−04 | 0.5497E−07 | −0.3793E−09 | |

TABLE 15

LENS SYSTEM DATA
Zoom Ratio 1.94

| | Short Focal Length Extremity | Intermediate Focal Length | Long Focal Length Extremity |
|---|---|---|---|
| FNO. | 3.6 | 3.9 | 4.6 |
| f | 12.33 | 16.04 | 23.91 |
| W | 50.6 | 42.1 | 30.5 |
| Y | 14.24 | 14.24 | 14.24 |
| fB | 37.91 | 42.16 | 50.34 |
| L | 135.49 | 128.72 | 127.15 |
| d8 | 12.24 | 5.46 | 3.88 |
| d10 | 21.01 | 15.24 | 4.00 |
| d15 | 2.20 | 4.04 | 8.90 |
| d21 | 7.70 | 7.39 | 5.60 |

TABLE 16

LENS GROUP DATA

| Lens Group | 1st Surf. | Focal Length |
|---|---|---|
| 1 | 1 | −20.62 |
| 2 | 9 | ∞ |
| 3 | 11 | 28.66 |
| 4 | 17 | −32.82 |
| 5 | 22 | 34.35 |

The numerical values of each condition for each embodiment are shown in Table 17.

TABLE 17

| | Embod. 1 | Embod. 2 | Embod. 3 | Embod. 4 | Embod. 5 |
|---|---|---|---|---|---|
| Cond. (1) | 1.43 | 3.35 | 1.30 | 2.85 | 1.67 |
| Cond. (2) | 0.117 | 0.117 | 0.150 | 0.117 | 0.162 |

As can be understood from Table 17, the first through fifth embodiments satisfy conditions (1) and (2). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A retrofocus wide-angle lens system, wherein the entire said wide-angle lens system is divided at a position that satisfies the following condition (1) between a theoretical front lens group having a negative refractive power, and a theoretical rear lens group having a positive refractive power including the diaphragm, at a minimum focal length, and wherein a flat parallel plate is disposed at said position that satisfies the following condition (1):

$$1.2<|fF/f|<4.0 \qquad (1),$$

wherein fF designates the focal length of said theoretical front lens group having a negative refractive power, and f designates the focal length of the entire said wide-angle lens system.

2. The retrofocus wide-angle lens system according to claim 1, wherein said wide-angle lens system comprises a wide-angle fixed focal-length lens system.

3. The retrofocus wide-angle lens system according to claim 1, wherein said wide-angle lens system comprises a wide-angle zoom lens system.

4. The retrofocus wide-angle lens system according to claim 3, wherein the position of said flat parallel plate remains at a fixed position on the optical axis during a zooming operation.

5. The retrofocus wide-angle lens system according to claim 1, wherein said wide-angle lens system satisfies the following condition (2) at a minimum focal length:

$$0.1<d/f \qquad (2),$$

wherein d designates the thickness of said flat parallel plate, and f designates the focal length of the entire said wide-angle lens system.

6. The retrofocus wide-angle lens system according to claim 1, wherein said flat parallel plate comprises an optical filter.

7. The retrofocus wide-angle lens system according to claim 1, wherein said flat parallel plate comprises a dummy glass plate.

8. An optical instrument provided with a retrofocus wide-angle lens system according to claim 1.

* * * * *